(12) United States Patent
Takahashi et al.

(10) Patent No.: US 7,239,470 B2
(45) Date of Patent: Jul. 3, 2007

(54) HEATER CONTROL METHOD AND STORAGE APPARATUS

(75) Inventors: Yasuhiko Takahashi, Kawasaki (JP); Yoshihiro Amemiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/267,122

(22) Filed: Nov. 4, 2005

(65) Prior Publication Data

US 2007/0019319 A1    Jan. 25, 2007

(30) Foreign Application Priority Data

Jul. 19, 2005    (JP)    ............................. 2005-208650

(51) Int. Cl.
 *G11B 21/02*    (2006.01)
(52) U.S. Cl. .......................................... 360/75; 360/31
(58) Field of Classification Search .................... None
See application file for complete search history.

(56) References Cited

U.S. PATENT DOCUMENTS

| | | | | |
|---|---|---|---|---|
| 5,991,113 A | * | 11/1999 | Meyer et al. | ................. 360/75 |
| 6,975,472 B2 | * | 12/2005 | Stover et al. | ................. 360/59 |
| 7,023,645 B1 | * | 4/2006 | Emo et al. | ..................... 360/75 |
| 7,046,473 B2 | * | 5/2006 | Fu et al. | ........................ 360/75 |
| 7,061,706 B2 | * | 6/2006 | Conteras et al. | .............. 360/75 |
| 7,088,545 B1 | * | 8/2006 | Singh et al. | .................. 360/75 |
| 2005/0057841 A1 | | 3/2005 | Stover et al. | ................. 360/59 |
| 2006/0023331 A1 | * | 2/2006 | Flechsig et al. | .............. 360/61 |

FOREIGN PATENT DOCUMENTS

| | | |
|---|---|---|
| JP | 2004-013931 | 1/2004 |
| JP | 2004-342151 | 12/2004 |

* cited by examiner

*Primary Examiner*—K. Wong
(74) *Attorney, Agent, or Firm*—Greer, Burns & Crain, LTD (57) ABSTRACT

A heater control method for a built-in heater of a head includes turning the heater ON during a time corresponding to consecutive read operation time and write operation time, and turning the heater OFF during a time corresponding to a read operation time after a write operation time.

22 Claims, 12 Drawing Sheets

HEATER CONTROL METHOD AND STORAGE APPARATUS

BACKGROUND OF THE INVENTION

1. Field of the Invention

The present invention generally relates to heater control methods and storage apparatuses, and more particularly to a heater control method for controlling a built-in or integrated heater of a head, and a storage apparatus that is provided with a head having a built-in or integrated heater controlled by such a heater control method.

2. Description of the Related Art

A head used in a storage apparatus such as a conventional hard disk drive (HDD) is deformed depending on a temperature change, and for this reason, an error rate changes due to the effects of the head deformation. The temperature change includes a temperature change caused by an environment in which the head is used, and a temperature change caused by the heat that is generated by the head itself.

Particularly in the case of a head which has a relatively low temperature at an initial stage of a write operation, the head is deformed by the heat that is generated by the head itself when the write operation is carried out, and a gap between the head and a recording medium such as a disk medium changes. For this reason, the error rate is poor at the initial stage of the write operation because the gap between the head and the disk medium is large and the write ability (or capability) is poor, but the gap between the head and the disk medium decreases with the lapse of time and the write ability improves to thereby improve the error rate. As a result, when designing the HDD, it is difficult to set the gap between the head and the disk medium to an optimum value suited for high-density recording, and in addition, it is difficult to greatly improve the yield of the HDD.

Recently, a technique has been developed which provides a heater within the head, and controls the heater by a heater driving circuit to control the heat generated by the head, so as to control the deformation of the head in use. By controlling the head deformation, that is, a projecting amount of the head with respect to the disk medium, it is possible to control the gap between the head and the disk medium. Such a technique is proposed in a Japanese Laid-Open Patent Application No. 2004-13931, a Japanese Laid-Open Patent Application No. 2004-342151, and a U.S. Patent Application Publication No. US2005/0057841A1.

Figure 1:
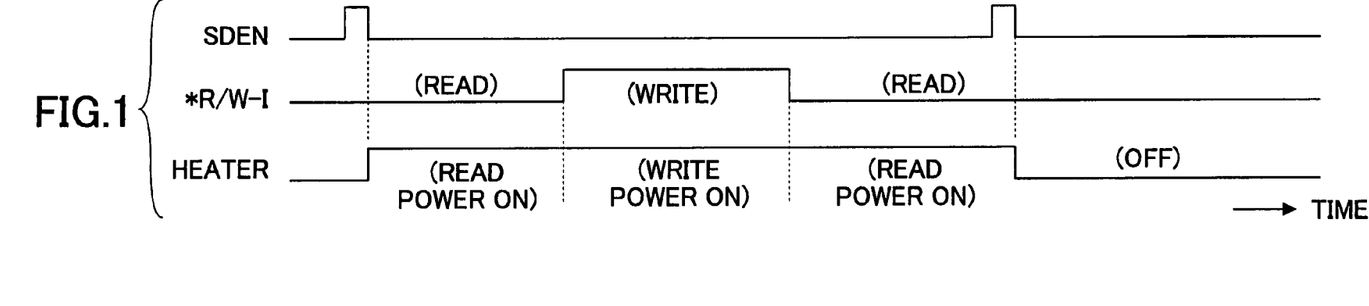
FIG. 1 is a time chart for explaining heater ON/OFF timings of the prior art.

FIG. 1 is a time chart for explaining heater ON/OFF timings of the prior art corresponding to the U.S. Patent Application Publication No. US2005/0057841A1. In FIG. 1, SDEN denotes a control signal for controlling ON/OFF states of the heater, *R/W-I denotes a signal indicating a read/write command processing time (low active), and Heater denotes a signal indicating a heater ON/OFF time. As may be seen from FIG. 1, after the ON-value of the control signal SDEN is set in a register and the heater is turned ON via a serial interface, the heater is maintained in the ON state until the OFF-value of the control signal SDEN is set in the register and the heater is turned OFF via the serial interface, even if a target write interval in which the heater is to be turned ON ends. In other words, although the heater does not need to be maintained in the ON state during the read command processing time after the write command processing time, the heater is maintained in the ON state to thereby consume unnecessary power.

When driving the head having the built-in heater, the power consumption increases compared to the case where no built-in heater is provided in the head. However, the prior art controls the ON/OFF states of the heater via the serial interface, and there is a problem in that it is difficult to reduce the power consumption because the heater is driven even at times that are actually unnecessary.

SUMMARY OF THE INVENTION

Accordingly, it is a general object of the present invention to provide a novel and useful heater control method and storage apparatus, in which the problems described above are suppressed.

Another and more specific object of the present invention is to provide a heater control method and a storage apparatus, which can suppress the power consumption of a head having a built-in heater using a relatively simple structure.

Still another object of the present invention is to provide a heater control method for carrying out an ON/OFF control with respect to a built-in heater of a head, comprising turning the heater ON during a time corresponding to consecutive read operation time and write operation time; and turning the heater OFF during a time corresponding to a read operation time after a write operation time. According to the heater control method of the present invention, it is possible to suppress the power consumption of the head having the built-in heater using a relatively simple structure.

A further object of the present invention is to provide a storage apparatus comprising a head having a built-in heater and configured to read information from and write information on a recording medium; and a heater driving circuit configured to carry out an ON/OFF control with respect to the heater, wherein the heater driving circuit turns the heater ON during a time corresponding to consecutive read operation time and write operation time, and turns the heater OFF during a time corresponding to a read operation time after a write operation time. According to the storage apparatus of the present invention, it is possible to suppress the power consumption of the head having the built-in heater using a relatively simple structure.

Another object of the present invention is to provide a heater control method for carrying out an ON/OFF control with respect to a built-in heater of a head, comprising prohibiting the ON/OFF control of the heater during a time that is sufficiently short such that a shape of the head does not follow a change in a wattage of the heater. According to the heater control method of the present invention, it is possible to suppress the power consumption of the head having the built-in heater using a relatively simple structure.

Still another object of the present invention is to provide a heater control method for carrying out an ON/OFF control with respect to a built-in heater of a head, comprising setting an upper limit of a wattage of the heater at a time when a contact between the head and a recording medium is detected. According to the heater control method of the present invention, it is possible to suppress the power consumption of the head having the built-in heater using a relatively simple structure.

A further object of the present invention is to provide a heater control method for carrying out an ON/OFF control with respect to a built-in heater of a head, comprising setting an upper limit of a wattage of the heater at a time when a saturation state of a heater driving circuit that drives the heater is detected. According to the heater control method of the present invention, it is possible to suppress the power consumption of the head having the built-in heater using a relatively simple structure.

Another object of the present invention is to provide a heater control method for carrying out an ON/OFF control with respect to a built-in heater of a head, comprising setting a wattage of the heater by switching from a value for normal operation to an upper limit value at a predetermined timing. According to the heater control method of the present invention, it is possible to suppress the power consumption of the head having the built-in heater using a relatively simple structure.

Other objects and further features of the present invention will be apparent from the following detailed description when read in conjunction with the accompanying drawings.

DESCRIPTION OF THE PREFERRED EMBODIMENTS

A description will be given of embodiments of the heater control method and the storage apparatus according to the present invention, by referring to FIG. 2 and the subsequent figures.

Figure 2:
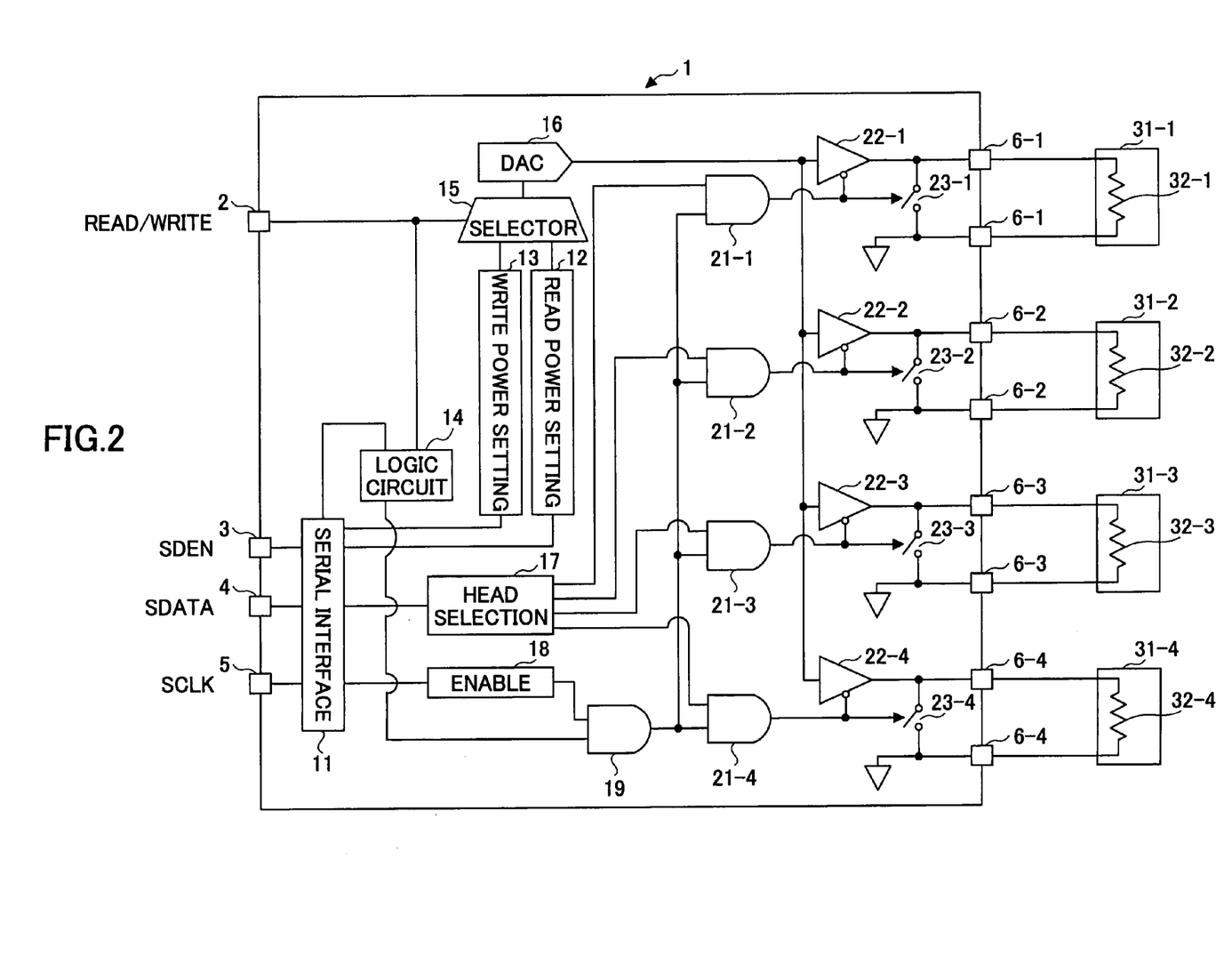
FIG. 2 is a circuit diagram showing an important part of a first embodiment of the storage apparatus according to the present invention.

FIG. 2 is a circuit diagram showing an important part of a first embodiment of the storage apparatus according to the present invention. This first embodiment of the storage apparatus employs a first embodiment of the heater control method according to the present invention. In this first embodiment, the present invention is applied to the HDD.

The HDD that is used may have a known basic structure. The basic structure of the HDD includes a head which reads information from and writes information on a magnetic disk, a controller which is formed by a processor or the like and controls the operation of the entire HDD, a head IC which includes a memory and a register and processes a signal supplied to the head and a signal output from the head, and a driving part which rotates the magnetic disk. The HDD reads data from the magnetic disk in response to a read command from a host unit, and writes data on the magnetic disk in response to a write command from the host unit.

Of the basic structure, FIG. 2 only shows a heater driving circuit 1 and heads 31-1 through 31-4 that are directly related to the subject matter of the present invention. It is assumed for the sake of convenience that the heater driving circuit 1 drives four heads 31-1 through 31-4. However, the number of heads is not limited to four, and the number of built-in heaters of each head is not limited to one. The heater driving circuit 1 may be provided within the head IC described above or, provided between the head IC and the heads 31-1 through 31-4. In addition, the heater driving circuit 1 may be formed by a single semiconductor chip.

The heater driving circuit 1 has a read/write terminal 2 to which a read command Read or a write command Write is input from the host unit via the head IC, a control terminal 3 to which a control signal SDEN for controlling ON/OFF states of built-in heaters 32-1 through 32-4 of the heads 31-1 through 31-4 is input from the head IC, a data terminal 4 to which a data SDATA indicating a read/write operation time and a read/write power (wattage) of each of the heads 31-1 through 31-4 is input from the head IC, a clock terminal 5 to which a clock SCLK is input from the head IC, and output terminal pairs 6-1 through 6-4. The output terminal pairs 6-1 through 6-4 are connected to the heaters 32-1 through 32-4 of the corresponding heads 31-1 through 31-4.

A serial interface 11, a read power setting circuit 12, a write power setting circuit 13, a logic circuit 14, a selector circuit 15, a digital-to-analog converter (DAC) 16, a head selection circuit 17, an enable circuit 18, AND circuits 19 and 21-1 through 21-4, driver parts 22-1 through 22-4 forming a power amplifier, and switching circuits 23-1 through 23-4 that are connected as shown in FIG. 2 are provided within the heater driving circuit 1.

The read/write command Read/Write that is input to the read/write terminal 2 is supplied to the logic circuit 14 and the selector circuit 15. The control signal SDEN, the data SDATA and the clock SCLK that are respectively input to the control terminal 3, the data terminal 4 and the clock terminal 5 are supplied to the serial interface 11. The logic circuit 14 turns the corresponding heaters ON during consecutive read command processing time and write command processing time, turns the corresponding heaters OFF during the read command processing time after the write command processing time, and generates and supplies to the AND circuit 19 a signal indicating ON/OFF times of the heaters 32-1 through 32-4, based on the read/write command Read/Write, and the control signal SDEN and the clock SCLK that are obtained via the serial interface 11. The enable circuit 18 generates and supplies to the AND circuit 19 a signal indicating whether or not to enable the ON/OFF control of the heaters 32-1 through 32-4, based on the control signal SDEN and the clock SCLK that are obtained via the serial interface 11. An output of the AND circuit 19 is supplied to each of the AND circuits 21-1 through 21-4.

On the other hand, the head selection circuit 17 generates and supplies to the AND circuits 21-1 through 21-4 selection signals indicating the heads that are used for the read/write operation, that is, indicating the heads that are selected, based on the data SDATA and the clock SCLK that are obtained via the serial interface 11. Output signals of the AND circuits 21-1 through 21-4 control ON/OFF states of the corresponding switching circuits 23-1 through 23-4. Accordingly, of the AND circuits 21-1 through 21-4, each AND circuit corresponding to the selected head controls the corresponding switching circuit to the ON state, and the built-in heater of each corresponding selected head is turned ON via the corresponding one of the output terminal pairs 6-1 through 6-4.

The read power is set to the read power setting circuit 12 based on the data SDATA that is supplied from the serial interface 11. Similarly, the write power is set to the write power setting circuit 13 based on the data SDATA that is supplied from the serial interface 11. The selector circuit 15 outputs the read power from the read power setting circuit 12 to the DAC 16 when the read command Read is supplied, and outputs the write power from the write power setting circuit 13 to the DAC 16 when the write command Write is supplied. A signal (voltage) indicating the read/write power, which is obtained by the digital-to-analog conversion in the DAC 16 is supplied to each of the driver parts 22-1 through 22-4. Hence, during the read/write operation, the signal (voltage) indicating the read/write power from each of the driver parts 22-1 through 22-4 is supplied to the built-in heater of each corresponding selected head via the corresponding one of the output terminal pairs 6-1 through 6-4 that corresponds to one of the switching circuits 23-1 through 23-4 that is turned ON.

Figure 3:
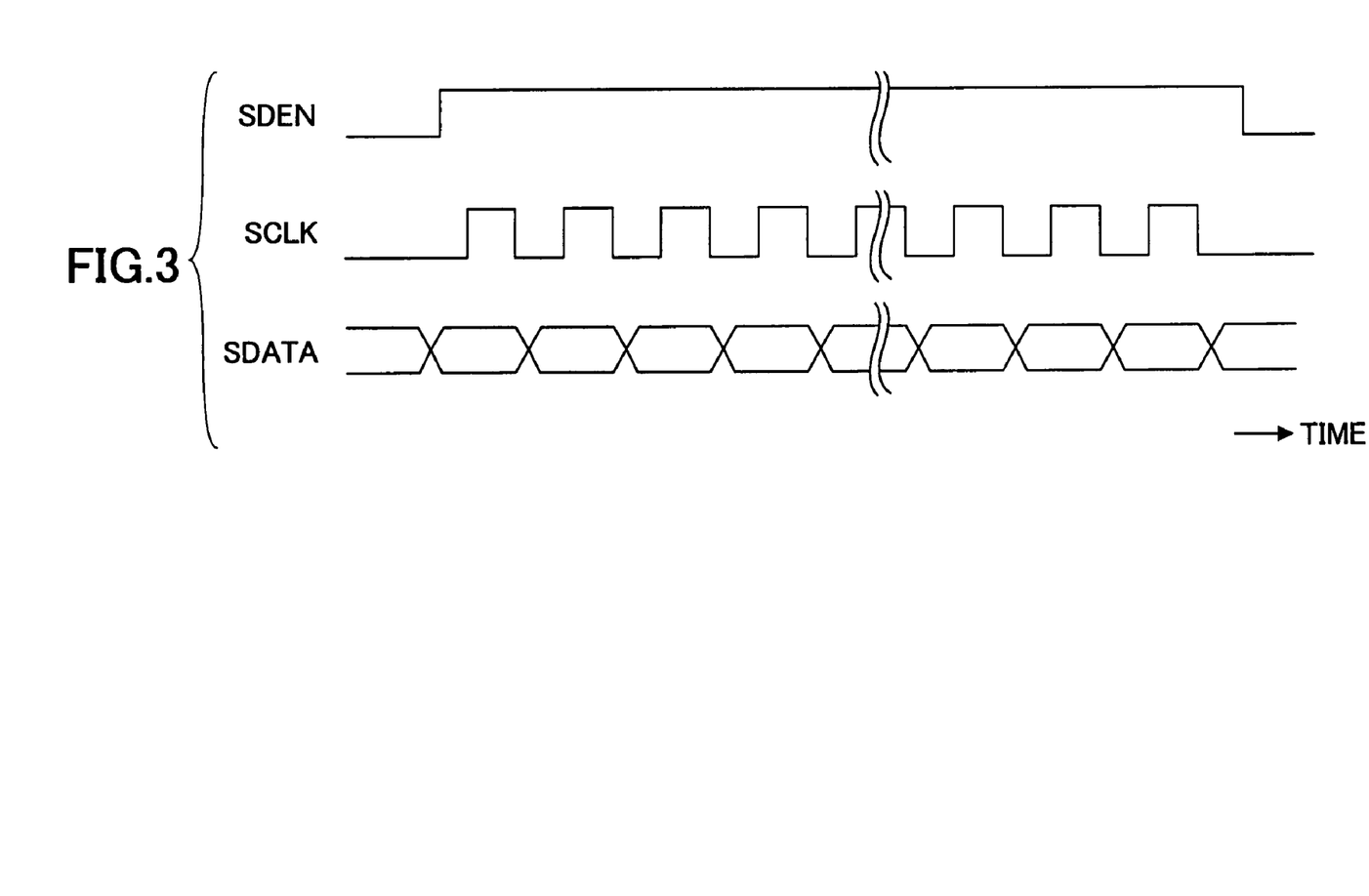
FIG. 3 is a time chart showing a control signal, a clock and a data.
Figure 4:
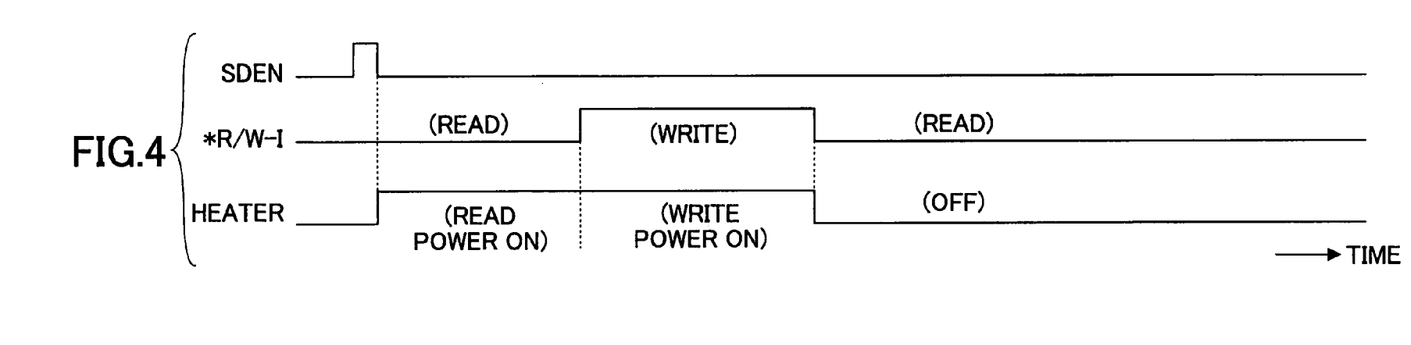
FIG. 4 is a time chart for explaining heater ON/OFF timings of the first embodiment.

FIG. 3 is a time chart showing the control signal SDEN, the clock SCLK and the data SDATA. In addition, FIG. 4 is a time chart for explaining the heater ON/OFF timings for the heaters 32-1 through 32-4 of this first embodiment. In FIG. 4, SDEN denotes the control signal for controlling the heater ON/OFF states, *R/W-I denotes a signal (low active) indicating the read/write command processing time obtained from a signal *R/W indicating the read/write operation time or the like within the logic circuit 14, and Heater denotes a signal indicating the ON/OFF times of the heaters 32-1 through 32-4. As shown in FIG. 4, during the read command processing time after the write command processing time, a signal which turns the heater OFF is supplied from the serial interface 11 to the AND circuit 19 in this embodiment because it is unnecessary to further heat the head that was selected during these processing times by the heater.

In this embodiment, it is unnecessary to generate a control signal exclusively for finely controlling the ON/OFF states of the heaters by the controller within the head IC, that is, by the firmware. By automatically turning OFF the heaters 32-1 through 32-4 by the heater driving circuit 1, the heater of the corresponding head can be turned OFF during the read command processing time corresponding to the read operation time, which is after the write command processing time corresponding to the write operation time, by use of a relatively simple structure. Consequently, it is possible to suppress the increase in the power consumption of the HDD caused by the driving of the heaters to a short time.

A circuit diagram of an important part of a second embodiment of the storage apparatus according to the present invention may be the same as that shown in FIG. 2, and an illustration and description thereof will be omitted. This second embodiment of the storage apparatus employs a second embodiment of the heater control method according to the present invention. In this second embodiment, the present invention is also applied to the HDD.

Figure 5:
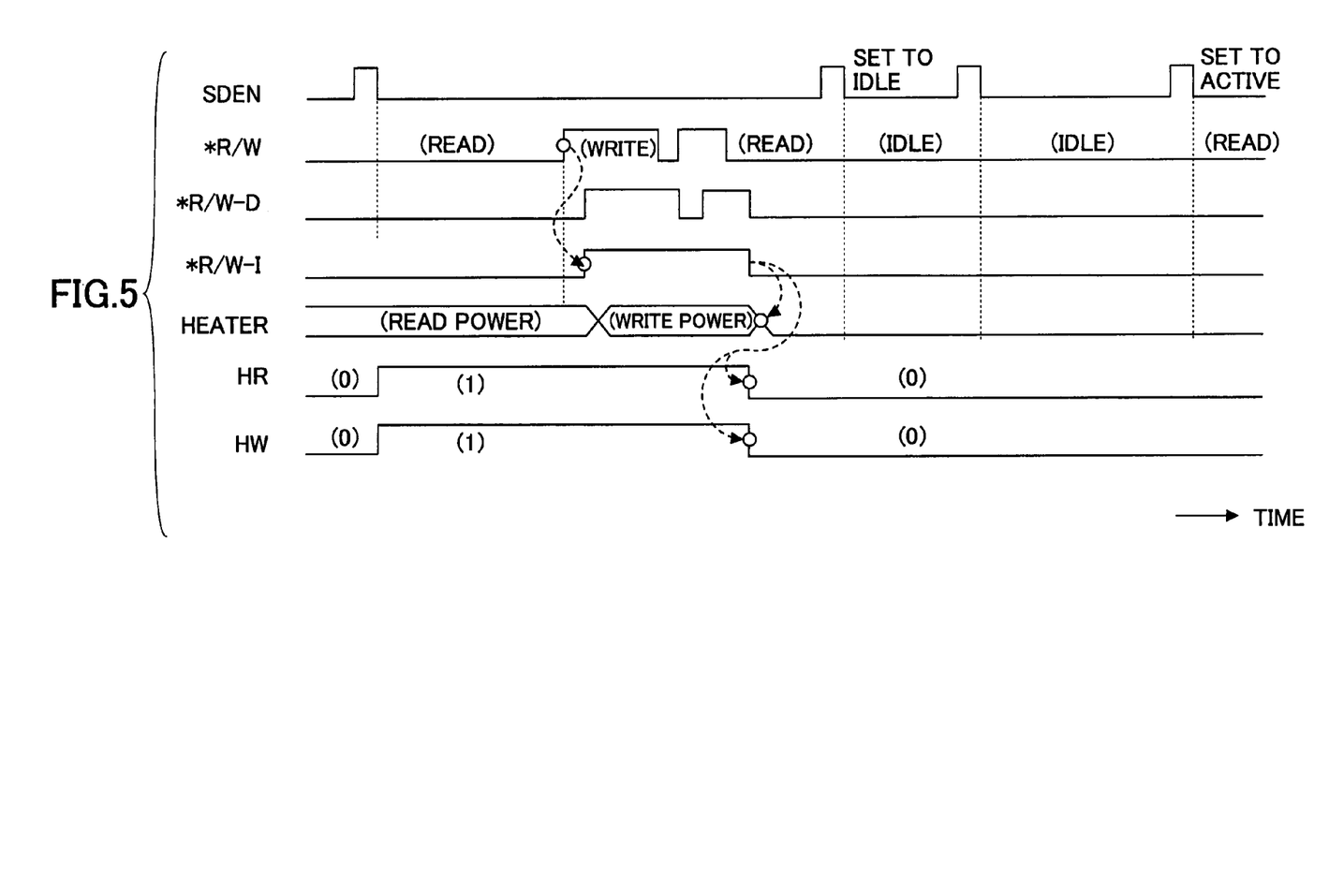
FIG. 5 is a time chart for explaining heater ON/OFF timings of a second embodiment of the storage apparatus according to the present invention.

FIG. 5 is a time chart for explaining the heater ON/OFF timings for the heaters 32-1 through 32-4 of this second embodiment. In FIG. 5, those parts which are the same as those corresponding parts in FIG. 4 are designated by the same reference numerals, and a description thereof will be omitted. In FIG. 5, *R/W-D denotes a signal which indicates a read/write command processing time corresponding to the read/write operation time obtained by delaying the signal *R/W (low active) indicating the read/write operation time by a predetermined time within the logic circuit 14, and *R/W-I denotes a signal which indicates the read/write command processing time obtained from a logical sum (OR) of the signals *R/W and *R/W-D within the logic circuit. In addition, HR denotes a signal output from the logic circuit 14 to the AND circuit 19 during the read command processing time, and this signal HR is cleared (turned OFF) at a timing when the signal *R/W-I indicating the read/write command processing time ends. HW denotes a signal output from the logic circuit 14 to the AND circuit 19 during the write command processing time, and this signal HW is cleared (turned OFF) at a timing when the signal *R/W-I indicating the read/write command processing time ends. In this case, the signal Heater (high-level or ON time) indicating the ON/OFF times of the heaters 32-1 through 32-4 also ends at a timing when the signal *R/W-I indicating the read/write command processing time ends.

Figure 6:
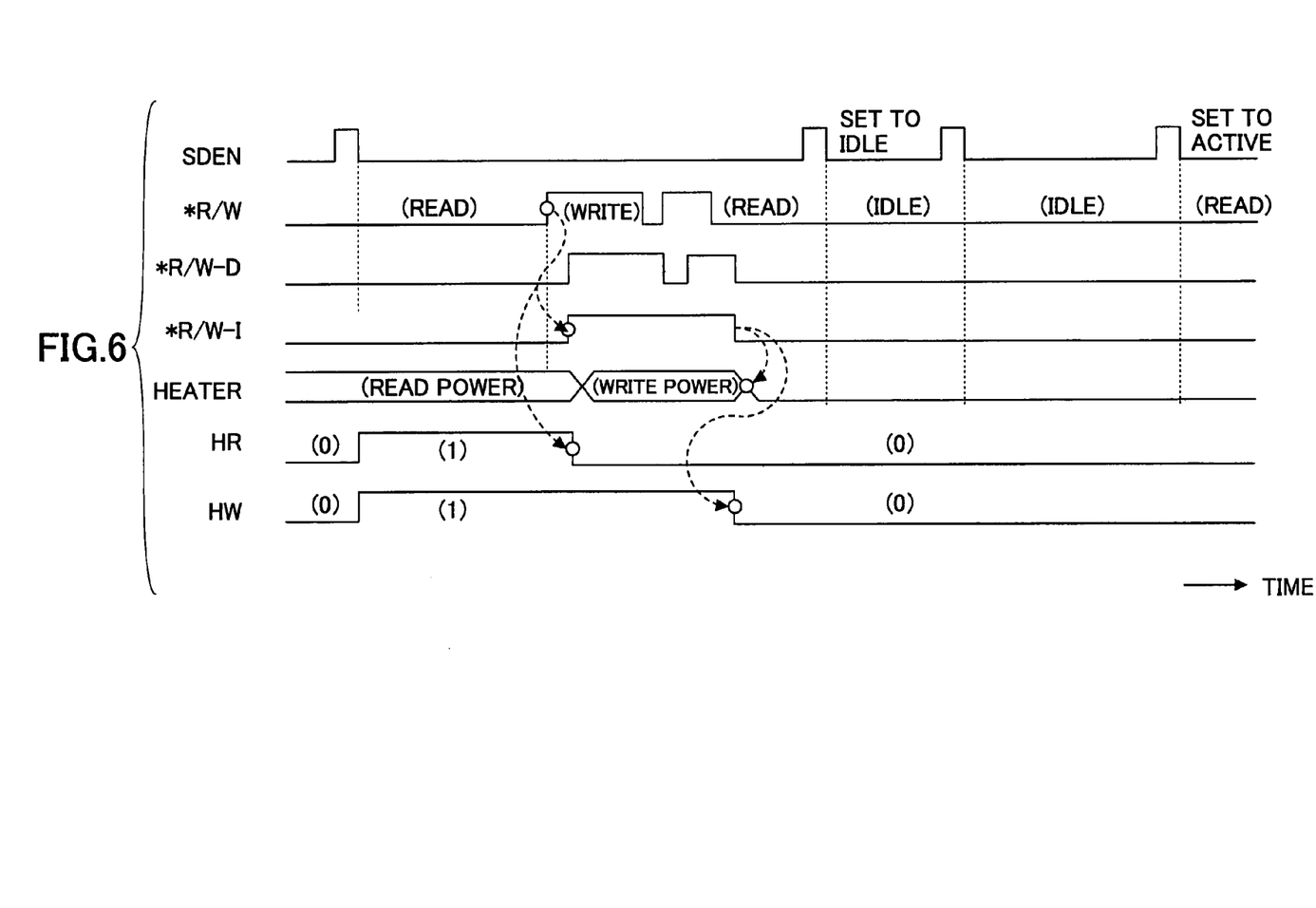
FIG. 6 is a time chart for explaining heater ON/OFF timings of a modification of the second embodiment.

The signals HR and HW may be generated at timings shown in FIG. 6. FIG. 6 is a time chart for explaining the heater ON/OFF timings for the heaters 32-1 through 32-4 of a modification of the second embodiment. In FIG. 6, those parts which are the same as those corresponding parts in FIG. 5 are designated by the same reference numerals, and a description thereof will be omitted.

In FIG. 6, the signal HR that is output from the logic circuit 14 to the AND circuit 19 during the read command processing time is cleared (turned OFF) at a timing when the signal *R/W-I indicating the read/write command processing time starts. Further, the signal HW that is output from the logic circuit 14 to the AND circuit 19 during the write command processing time is cleared (turned OFF) at a timing when the signal *R/W-I indicating the read/write command processing time ends.

The heat generated by the head during the read operation and the heat generated by the head during the write operation differ. Normally, the heat generated by the heater during the write operation may be lower than the heat generated by the heater during the read operation. However, since the head is controlled to a read state (that is, a state other than a write state) only for a short time during the write operation between sectors or in a gap between split sectors, the wattage of the heater will be increased excessively unless the ON/OFF control of the heater is prevented during the above short time. In addition, although the shape of the head does not follow the change in the wattage of the heater in the short time, unnecessary power consumption occurs if the wattage of the heater is increased excessively in order to control the head to the read state only for the short time during the write operation. The shape of the head follows the heat generated by the heater on the order of several µs, for example, and the short time in which the shape of the head does not follow the change in the wattage of the heater is on the order of several ns, for example.

In this second embodiment and the modification thereof, a dead zone is provided by the delay of the heater ON/OFF control timing, so as to prohibit the ON/OFF control of the heater during the short time in which (that is, during a time sufficiently short such that) the shape of the head does not follow the change in the wattage of the heater, and prevent unnecessary ON/OFF control of the heater from being carried out. Hence, it is possible to suppress an increase in the unnecessary power consumption that would otherwise occur if the heater were driven during the short time described above.

A circuit diagram of an important part of a third embodiment of the storage apparatus according to the present invention may be the same as that shown in FIG. 2, and an illustration and description thereof will be omitted. This third embodiment of the storage apparatus employs a third embodiment of the heater control method according to the present invention. In this third embodiment, the present invention is also applied to the HDD.

The limits of the power consumption and the projecting amount of the head are determined by the contact between the head and the recording medium such as the disk medium. However, if the heater is driven to further heat the head even though the head is in contact with the recording medium, unnecessary power consumption occurs, and there is a possibility of damaging the head. Accordingly, it is desirable to detect the contact between the head and the recording medium.

In this third embodiment, an upper limit of the heating by the heater is obtained by detecting the contact of the head and the recording medium, and this upper limit is reflected to the data SDATA that is generated within the head IC, so as to prevent the heater from being heated exceeding the upper limit. The upper limit of the heating by the heater may be stored in the memory within the head IC, and the controller, that is, the firmware may generate the data SDATA using the stored upper limit.

Figure 7:
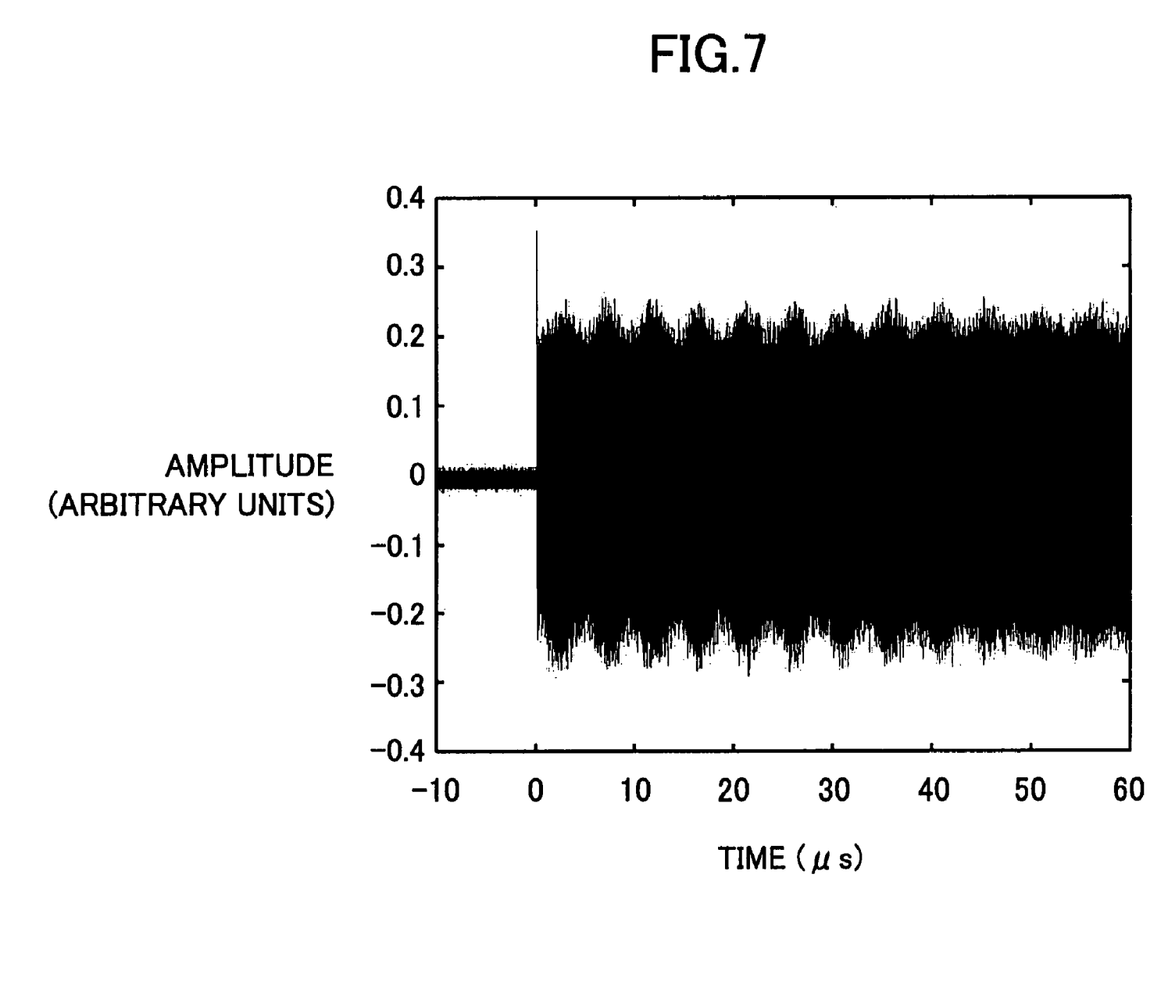
FIG. 7 is a diagram showing a read waveform when one head contacts a corresponding disk medium.

FIG. 7 is a diagram showing a read waveform when one head contacts a corresponding disk medium. In FIG. 7, the ordinate indicates the amplitude of the read waveform that is read from the disk medium by the head in arbitrary units, and the abscissa indicates the time in ps. As may be seen from FIG. 7, a modulation is generated in the read waveform at a predetermined period when the head makes contact with the disk medium.

Figure 8:
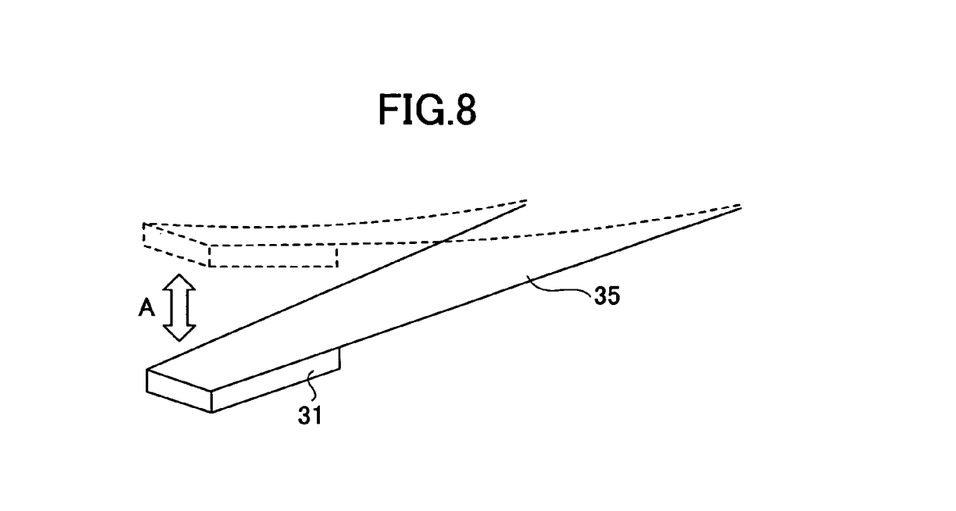
FIG. 8 is a perspective view for explaining a suspension of the head.

FIG. 8 is a perspective view for explaining a suspension of the head. When a head 31 makes contact with the disk medium (not shown), a suspension 35 moves up and down as indicated by an arrow A in a direction approximately perpendicular to a recording surface of the disk medium, thereby causing the modulation in the read waveform as shown in FIG. 7.

Figure 9:
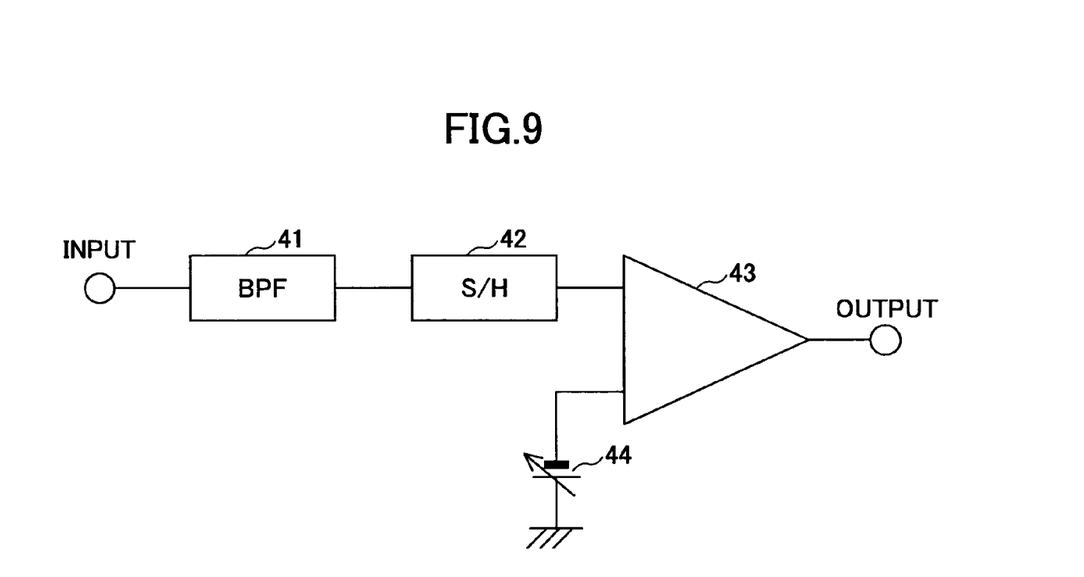
FIG. 9 is a block diagram showing a modulation detection circuit.

FIG. 9 is a block diagram showing a modulation detection circuit. The modulation detection circuit may be provided within the head IC or, connected externally to the head IC. A bandpass filter (BPF) 41 extracts frequency components of the modulation from the read waveform that is input thereto, and supplies the extracted frequency components to a sample and hold (S/H) circuit 42. The S/H circuit 42 integrates levels of the extracted frequency components and supplies an output to a comparator 43. A reference voltage corresponding to a detection slice level is also supplied to the comparator 32 from a reference voltage source 44. Hence, the comparator 43 detects the modulation of the read waveform by comparing the output level of the S/H circuit 42 and the detection slice level. A comparison result that indicates whether or not the modulation exists is output from the comparator 43 and supplied to the controller within the head IC as a modulation detection signal.

Of course, the method and circuit for detecting the contact between the head and the disk medium is not limited to the above described method and circuit that detects the modulation.

Figure 10:
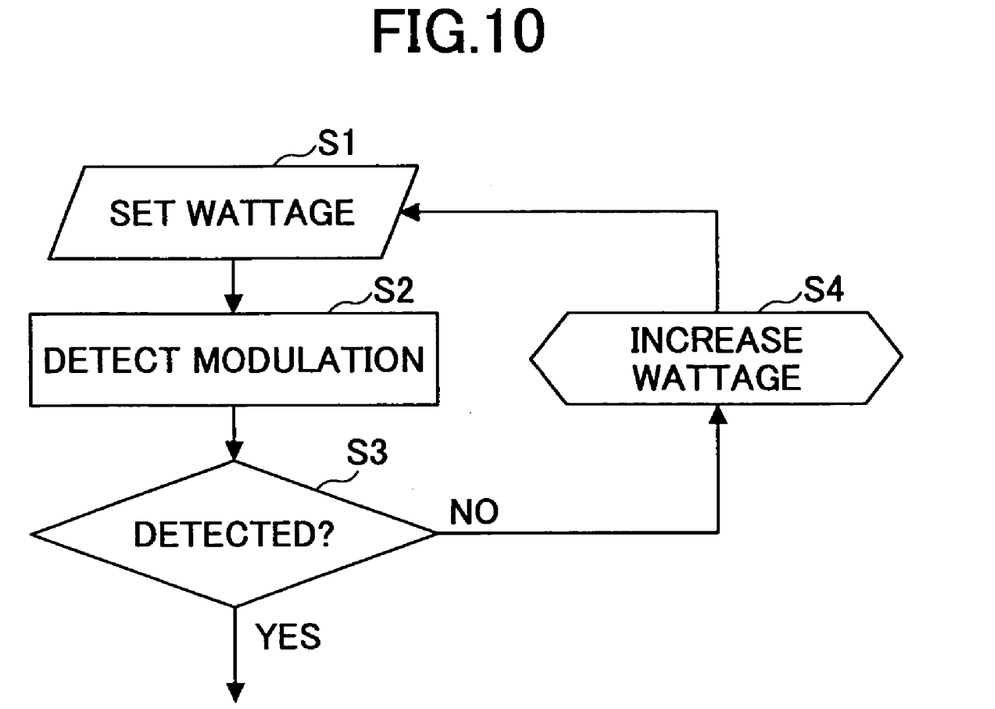
FIG. 10 is a flow chart for explaining an operation of a controller of a head IC in a third embodiment of the storage apparatus according to the present invention.

FIG. 10 is a flow chart for explaining an operation of the controller of the head IC, that is, the firmware, in this third embodiment of the storage apparatus according to the present invention. In FIG. 10, a step S1 sets the read/write power (wattage) with respect to the heaters 32-1 through 32-4 of each of the heads 31-1 through 31-4 depending on the read/write operation. A step S2 inputs the modulation detection signal that is detected by the modulation detection circuit described above. A step S3 decides whether or not the modulation detection signal indicates that the modulation has been detected. If the decision result in the step S3 is NO, a step S4 increases the read/write power with respect to the heaters 32-1 through 32-4 of each of the heads 31-1 through 31-4, and the process returns to the step S1. On the other hand, if the decision result in the step S3 is YES, the process advances to a process of generating the data SDATA or the like. Accordingly, when the contact between the head and the disk medium is detected and the decision result in the step S3 becomes YES, the read/write power is not increased, and the read/write power that was last set in the step S1 is obtained as the upper limit of the heating by the heater and stored in the memory if necessary.

According to this third embodiment, the heater is prevented from being driven to further heat the head after the head makes contact with the recording medium, by detecting the contact between the head and the recording medium. For this reason, it is possible to suppress unnecessary power consumption, and to prevent damage to the head that may otherwise occur if the heater is driven to further heat the head that made contact with the recording medium.

A circuit diagram of an important part of a fourth embodiment of the storage apparatus according to the present invention may be the same as that shown in FIG. 2, and an illustration and description thereof will be omitted. This fourth embodiment of the storage apparatus employs a fourth embodiment of the heater control method according to the present invention. In this fourth embodiment, the present invention is also applied to the HDD.

The limits of the power consumption and the projecting amount of the head are also determined by a power supply voltage of the heater driving circuit. However, if an attempt is made to drive the heater by outputting a larger power from the heater driving circuit even though the output power of the heater driving circuit is approaching the limit due to the power supply voltage, the heater driving circuit will consume unnecessary power, and there is a possibility of damaging the head. Hence, it is desirable to detect the limit of the heater driving circuit.

In this fourth embodiment, the upper limit of the heating by the heater is obtained by detecting that a saturation of the heater driving circuit, and this upper limit is reflected to the data SDATA that is generated within the head IC, so as to prevent the heater from being heated exceeding the upper limit. The upper limit of the heating by the heater may be stored in the memory within the head IC, and the controller, that is, the firmware may generate the data SDATA using the stored upper limit.

Figure 11:
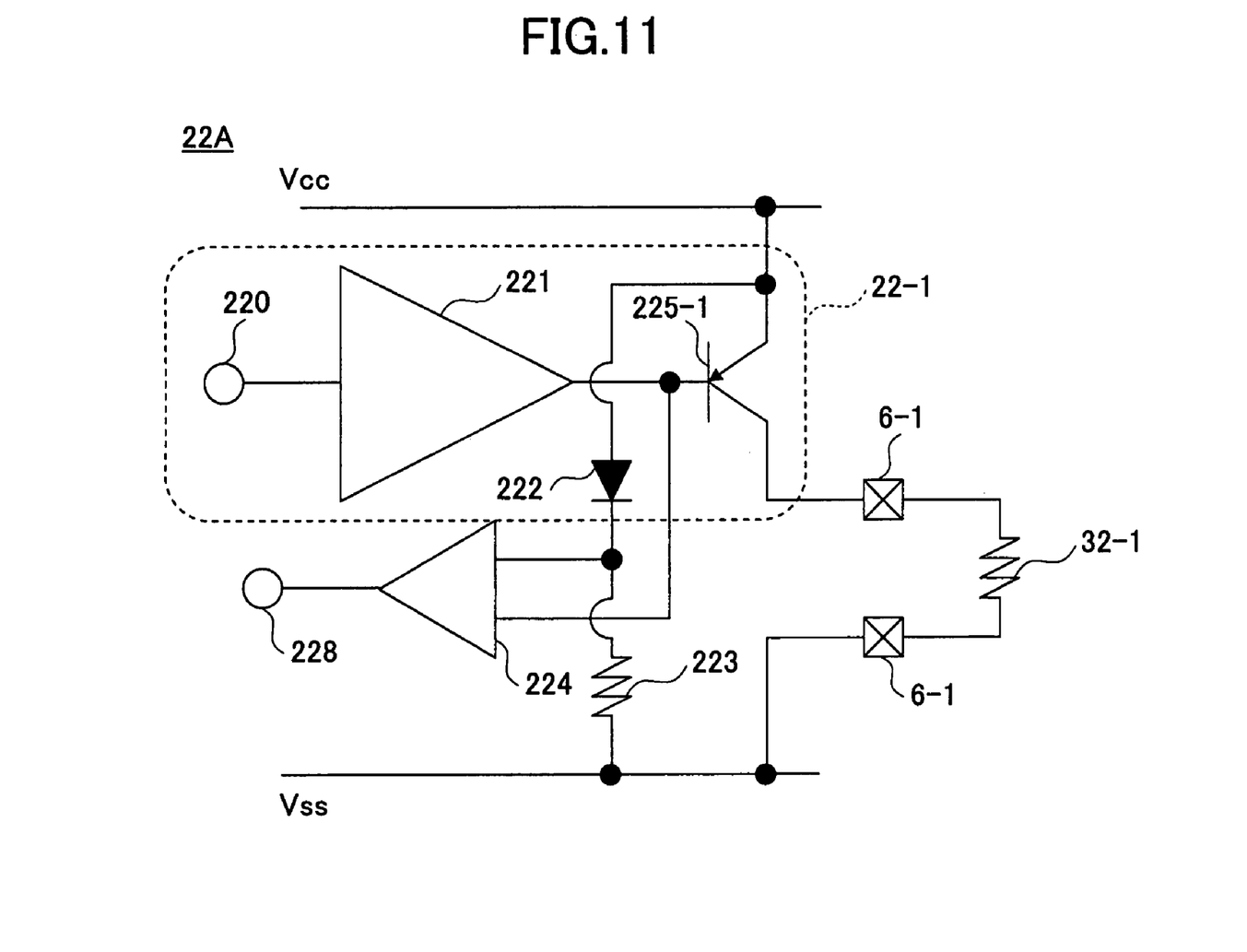
FIG. 11 is a circuit diagram showing a driver part including a saturation detection circuit.

FIG. 11 is a circuit diagram showing a driver part including a saturation detection circuit. It is assumed for the sake of convenience that a driver part 22A shown in FIG. 11 forms the driver part 22-1 shown in FIG. 2, but it is of course possible to use the driver part 22A as any one of the driver parts 22-2 through 22-4. The driver part 22A includes a driver 221, a diode 222, a resistor 223, a comparator 224 and a transistor 225-1 that are connected as shown in FIG. 11. The saturation detection circuit is formed by at least the comparator 224. In FIG. 11, Vcc and Vss respectively denote a power supply voltage and a ground voltage. The output signal (voltage) of the DAC 16 shown in FIG. 2 is input to a terminal 220. The comparator 224 compares an output of the driver 221 and an output obtained via the transistor 225-1 at the last stage and the diode 222, so as to detect the saturation of the driver part 22A by detecting the voltage at which the transistor 225-1 saturates. An output of the comparator 224 is supplied to the controller of the head IC via a terminal 228, as a saturation detection signal indicating that the driver part 22A is saturated.

Figure 12:
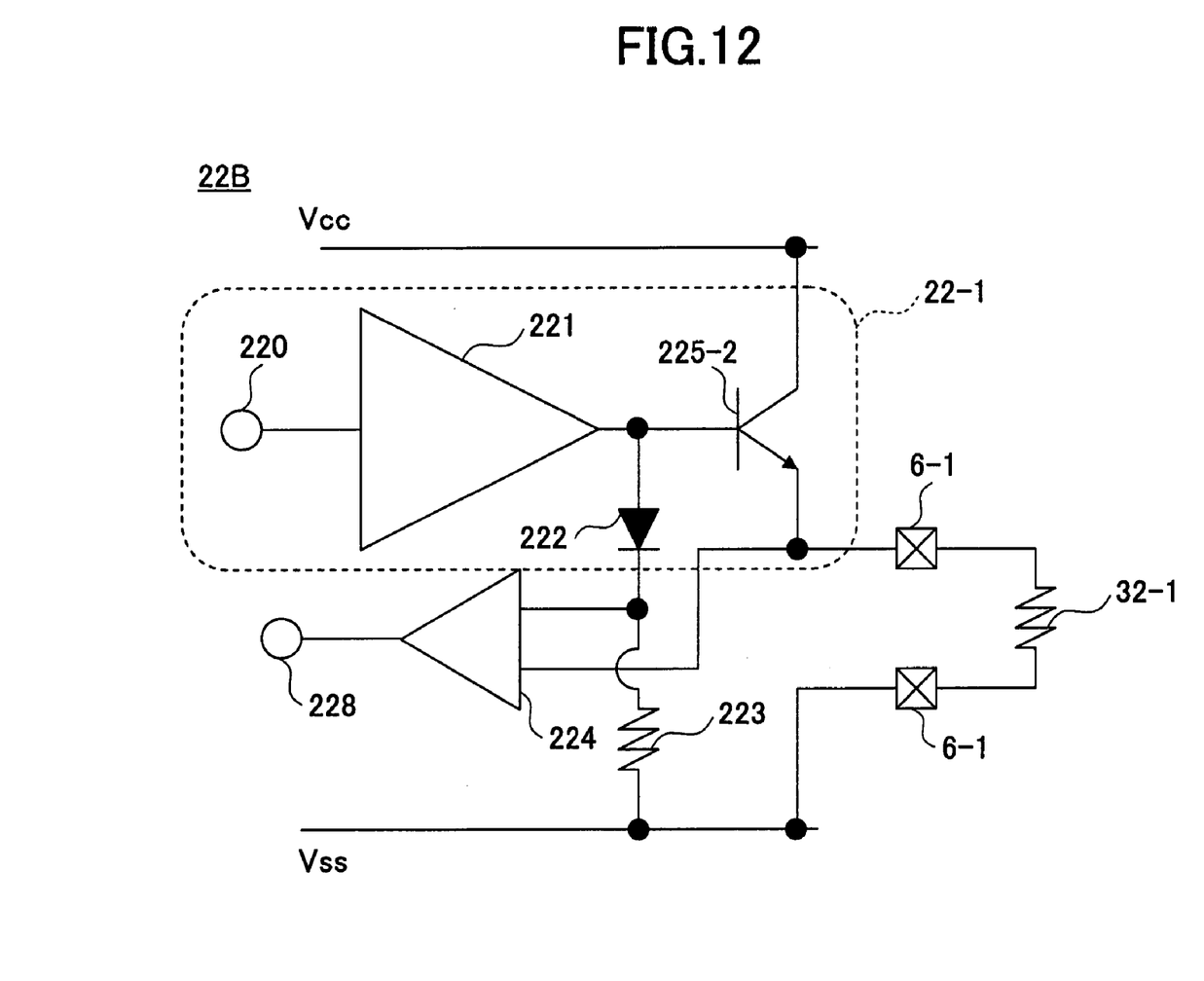
FIG. 12 is a circuit diagram showing a driver part including another saturation detection circuit.

FIG. 12 is a circuit diagram showing a driver part including another saturation detection circuit. In FIG. 12, those parts that are the same as those corresponding parts in FIG. 11 are designated by the same reference numerals, and a description thereof will be omitted. The driver part 22A shown in FIG. 11 employs a circuit system having a current source type last stage, but a driver part 22B shown in FIG. 12 is provided with a transistor 225-2 in place of the transistor 225-1 shown in FIG. 11, and employs a circuit system having a voltage source type last stage.

Of course, the method and circuit for detecting the driver part saturation is not limited to the above described method and circuit that detects the saturation state.

Figure 13:
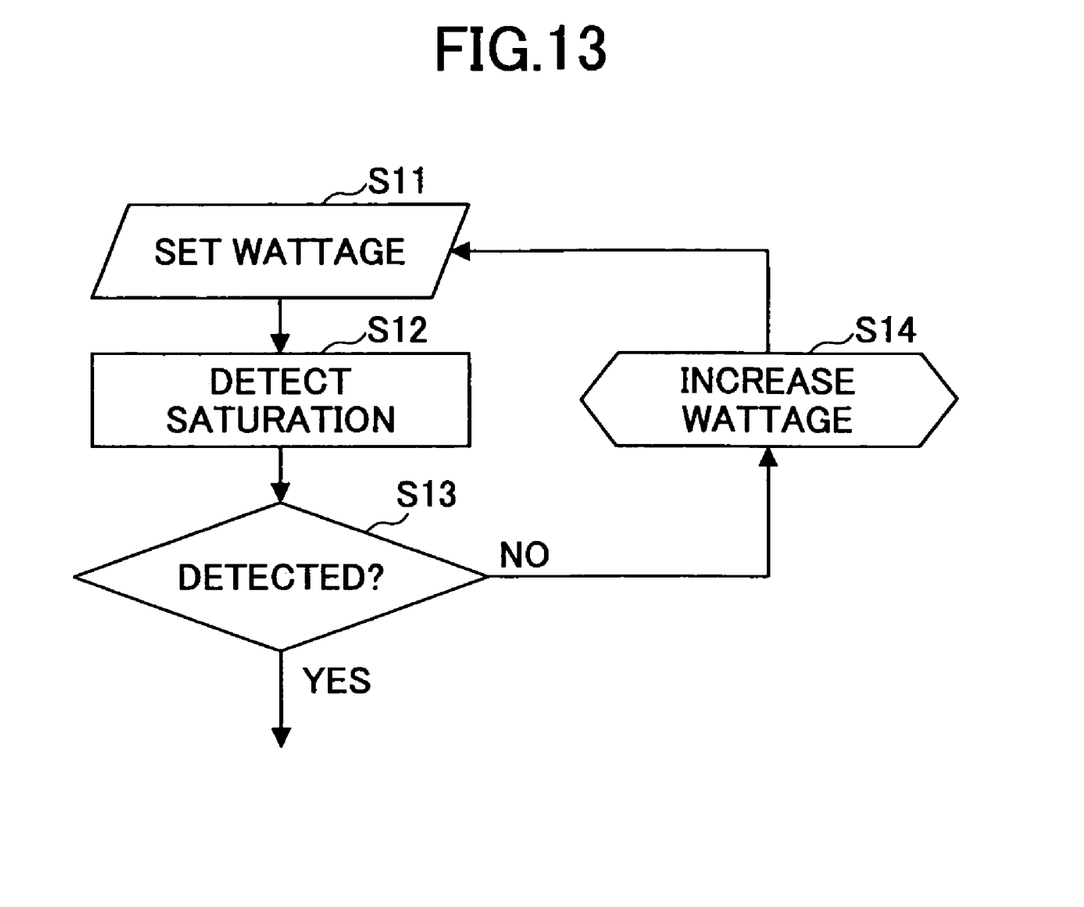
FIG. 13 is a flow chart for explaining an operation of a controller of a head IC in a fourth embodiment of the storage apparatus according to the present invention.

FIG. 13 is a flow chart for explaining an operation of the controller of the head IC, that is, the firmware, in this fourth embodiment of the storage apparatus according to the present invention. In FIG. 13, a step S11 sets the read/write power (wattage) with respect to the heaters 32-1 through 32-4 of each of the heads 31-1 through 31-4 depending on the read/write operation. A step S12 inputs the saturation detection signal that is detected by the saturation detection circuit described above. A step S13 decides whether or not the saturation detection signal indicates that the modulation has been detected. If the decision result in the step S13 is NO, a step S14 increases the read/write power with respect to the heaters 32-1 through 32-4 of each of the heads 31-1 through 31-4, and the process returns to the step S11. On the other hand, if the decision result in the step S13 is YES, the process advances to a process of generating the data SDATA or the like. Accordingly, when the saturation of the heater driving circuit 1 is detected and the decision result in the step S13 becomes YES, the read/write power is not increased, and the read/write power that was last set in the step S11 is obtained as the upper limit of the heating by the heater and stored in the memory if necessary.

According to this fourth embodiment, the heater is prevented from being driven to further heat the head after the heater driving circuit 1 saturates, by detecting the driving limit of the heater driving circuit 1 due to the external environment such as the power supply voltage, that is, by detecting the saturation of the heater driving circuit 1. For this reason, it is possible to suppress unnecessary power consumption.

The heater ON/OFF control timing of the heater control method according to the present invention may be set arbitrarily. For example, the heater ON/OFF control may be made at the time of testing the head when manufacturing the storage apparatus, at the time of forwarding the manufactured storage apparatus, and at the time when the user turns the power of the storage apparatus ON.

Of course, two or more embodiments of the first through fourth embodiment described above and the modification of the second embodiment may be suitably combined. For example, the heater control method for carrying out the ON/OFF control with respect to the built-in heater of the head may set a wattage of the heater by switching from a value for normal operation to an upper limit value at a predetermined timing, where the predetermined timing is a time when the contact between the head and the recording medium is detected or, a time when the saturation of the heater driving circuit that drives the heater is detected.

In each of the embodiments and modification described above, the present invention is applied to the HDD. However, the application of the present invention is not limited to the HDD, and the present invention is similarly applicable to various kinds of storage apparatuses provided with one or more heads with at least a built-in heater.

Therefore, the present invention is suited for application to various kinds of storage apparatuses provided with one or more heads with at least a built-in heater.

This application claims the benefit of a Japanese Patent Application No. 2005-208650 filed Jul. 19, 2005, in the Japanese Patent Office, the disclosure of which is hereby incorporated by reference.

Further, the present invention is not limited to these embodiments, but various variations and modifications may be made without departing from the scope of the present invention.

What is claimed is:

1. A heater control method for carrying out an ON/OFF control with respect to a built-in heater of a head, comprising:
    turning the heater ON during a write operation time, and during a read operation time other than an other read operation time which occurs immediately after the write operation time; and
    turning the heater OFF during said other read operation time.

2. The heater control method as claimed in claim 1, comprising:
    prohibiting the ON/OFF control of the heater during a time that is sufficiently short such that a shape of the head does not follow a change in a wattage of the heater.

3. The heater control method as claimed in claim 1, comprising:
    setting an upper limit of a wattage of the heater at a time when a contact between the head and a recording medium is detected.

4. The heater control method as claimed in claim 3, comprising:
    detecting the contact between the head and the recording medium by detecting a modulation in a read waveform that is read from the recording medium by the head.

5. The heater control method as claimed in claim 1, comprising:
    setting an upper limit of a wattage of the heater at a time when a saturation state of a heater driving circuit that drives the heater is detected.

6. A storage apparatus comprising:
    a head having a built-in heater and configured to read information from and write information on a recording medium; and
    a heater driving circuit configured to carry out an ON/OFF control with respect to the heater,
    wherein the heater driving circuit turns the heater ON during a write operation time, and during a read operation time other than an other read operation time which occurs immediately after the write operation time, and turns the heater OFF during said other read operation time.

7. The storage apparatus as claimed in claim 6, wherein the heater driving circuit prohibits the ON/OFF control of the heater during a time that is sufficiently short such that a shape of the head does not follow a change in a wattage of the heater.

8. The storage apparatus as claimed in claim 6, comprising:
    a setting part configured to set an upper limit of a wattage of the heater at a time when a contact between the head and the recording medium is detected.

9. The storage apparatus as claimed in claim 8, wherein the setting part detects the contact between the head and the recording medium by detecting a modulation in a read waveform that is read from the recording medium by the head.

10. The storage apparatus as claimed in claim 6, comprising:
a setting part configured to set an upper limit of a wattage of the heater at a time when a saturation state of the heater driving circuit that drives the heater is detected.

11. A heater control method for carrying out an ON/OFF control with respect to a built-in heater of a head, comprising:
prohibiting the ON/OFF control of the heater during a time that is sufficiently short such that a shape of the head does not follow a change in a wattage of the heater.

12. A heater control method for carrying out an ON/OFF control with respect to a built-in heater of a head, comprising:
setting an upper limit of a wattage of the heater at a time when a contact between the head and a recording medium is detected.

13. A heater control method for carrying out an ON/OFF control with respect to a built-in heater of a head, comprising:
setting an upper limit of a wattage of the heater at a time when a saturation state of a heater driving circuit that drives the heater is detected.

14. A heater control method for carrying out an ON/OFF control with respect to a built-in heater of a head, comprising:
setting a wattage of the heater by switching from a value for normal operation to an upper limit value at a predetermined timing.

15. The heater control method as claimed in claim 14, wherein the predetermined timing is a time when a contact between the head and a recording medium is detected, or a time when a saturation of a heater driving circuit that drives the heater is detected.

16. A circuit for controlling a built-in heater of a head which writes information on a recording medium and reads information from a recording medium, comprising:
a terminal part having terminals configured to receive data indicating a read operation time and a write operation time of the head; and
a circuit part configured to turn the heater ON during a write operation time, and during a read operation time other than an other read operation time which occurs immediately after the write operation time, and to turn the heater OFF during said other read operation time, in response to the data.

17. The circuit as claimed in claim 16, further comprising:
a circuit part configured to prohibit the ON/OFF control of the heater during a time that is sufficiently short such that a shape of the head does not follow a change in a wattage of the heater.

18. The circuit as claimed in claim 16, further comprising:
a setting part configured to set an upper limit of a wattage of the heater at a time when a contact between the head and the recording medium is detected.

19. The circuit as claimed in claim 18, wherein the setting part detects the contact between the head and the recording medium by detecting a modulation in a read waveform that is read from the recording medium by the head.

20. The circuit as claimed in claim 16, further comprising:
a setting part configured to set an upper limit of a wattage of the heater at a time when a saturation state of the circuit is detected.

21. The circuit as claimed in claim 16, wherein:
the data received by the terminals of the terminal part further indicate a read wattage and a write wattage of the head; and
the circuit part turns the heater ON with the read wattage during the read operation time other than said other read operation time, and turns the heater ON with the write wattage during the write operation time.

22. A storage apparatus comprising:
a head having a built-in heater and configured to read information from and write information on a recording medium;
a heater driving circuit configured to carry out an ON/OFF control with respect to the heater; and
a controller configured to transmit data indicating a read operation time and a write operation time of the head,
wherein the heater driving circuit turns the heater ON during the write operation time, and during a read operation time other than an other read operation time which occurs immediately after the write operation time, and turns the heater OFF during said other read operation time.

* * * * *